Figure 1:
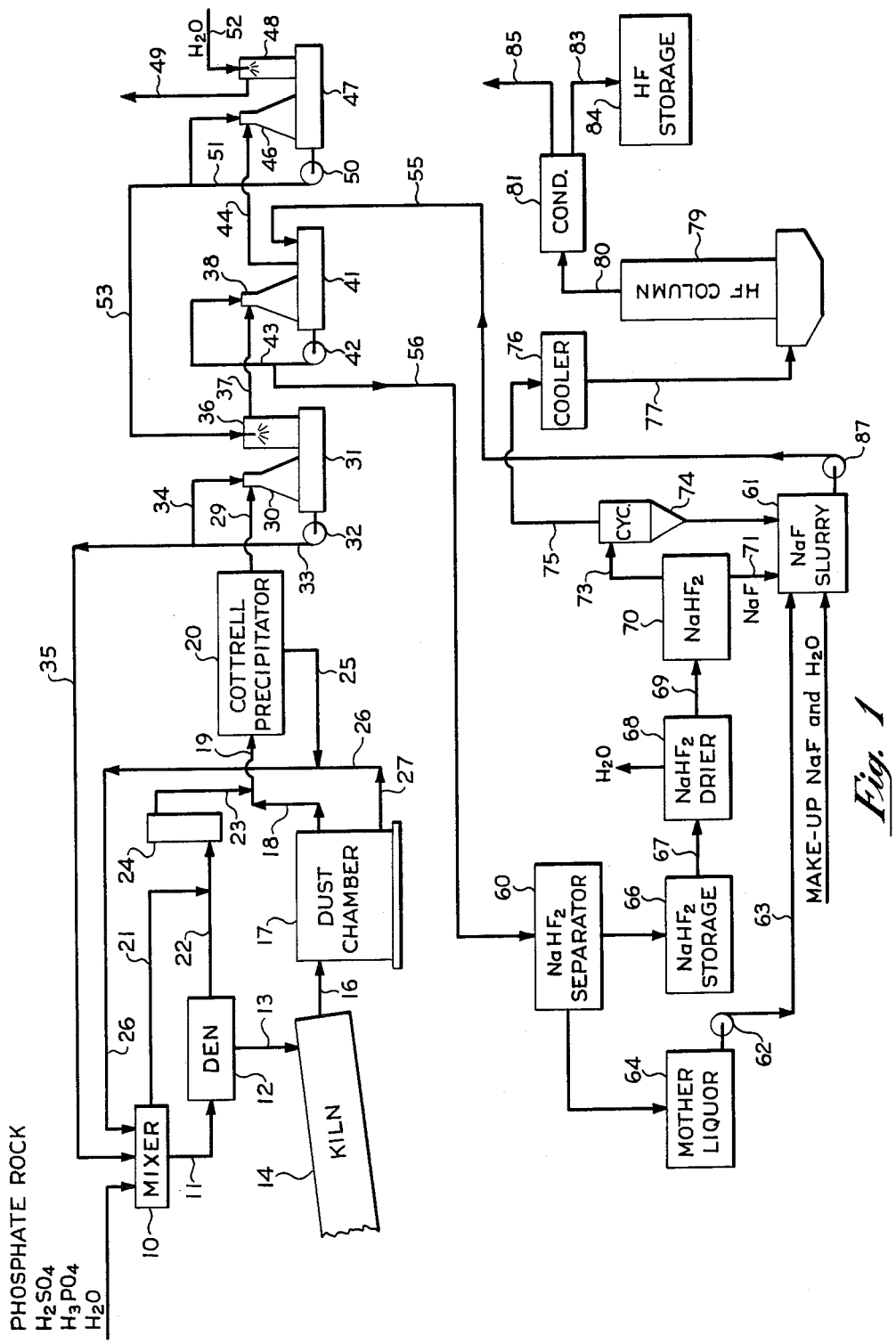

June 28, 1966 J. A. PETERSON ETAL 3,258,308
PROCESS FOR THE TREATMENT OF WASTE GASES
Filed Aug. 2, 1965 2 Sheets-Sheet 1

United States Patent Office 3,258,308
Patented June 28, 1966

3,258,308
PROCESS FOR THE TREATMENT OF
WASTE GASES
John A. Peterson, Niagara Falls, and Theodore H. Dexter, Lewiston, N.Y., and Rufus G. Hartig, Dover, Fla., assignors to Hooker Chemical Corporation, Niagara Falls, N.Y., a corporation of New York
Filed Aug. 2, 1965, Ser. No. 479,039
13 Claims. (Cl. 23—88)

This is a continuation-in-part of S.N. 197,522, filed May 24, 1962, now abandoned.

This invention pertains to the treatment and handling of waste gases resulting from the acidulation and/or calcination of phosphatic minerals to recover valuable products therefrom. Treatment of gases resulting from processes in the phosphorus and aluminum industries are particularly contemplated.

It is a principal object of this invention to provide methods for treatment and handling of waste gases resulting from the acidulation and/or calcination of phosphatic minerals to recover valuable products, particularly hydrogen fluoride.

Another object of the invention is to provide an improved process of the type described wherein, in a novel manner, the fluorine content of such waste gases is recovered efficiently and in an economic operation.

These and other objects will become apparent to those skilled in the art from the description which follows.

In accordance with the invention, a method is provided for recovering as sodium bifluoride, hydrogen fluoride from waste gases obtained in phosphate rock acidulation and calcination processes, which gases contain suspended solids, including dust, and fluorine values, including hydrogen fluoride and silicon tetrafluoride, comprising separating substantially all of the suspended solid impurities including the dust from the waste gas, contacting said waste gas mixture with an aqueous solution of fluosilicic acid saturated with hydrogen fluoride, thereby preferentially removing the silicon tetrafluoride constituents by absorbing said silicon tetrafluoride constituents in said fluosilicic acid solution and subsequently contacting said waste gas containing hydrogen fluoride from which said silicon tetrafluoride constituents were removed by absorption in the fluosilicic acid solution, with an aqueous sodium fluoride-sodium bifluoride slurry, thereby removing hydrogen fluoride from said waste gas by absorbing and reacting said hydrogen fluoride in said aqueous sodium fluoride-sodium bifluoride slurry to precipitate hydrogen fluoride as sodium bifluoride in said slurry.

Briefly, the invention contemplates the recovery, from waste gases resulting from the acidulation and/or calcination of phosphatic materials, of fluorine values by reaction of the fluorine values with sodium fluoride in suspension in water. The reaction of sodium fluoride, having the chemical formula, NaF, with fluorine values in hydrogen fluoride form results in a precipitate of sodium bifluoride, having the chemical formula NaHF$_2$, this latter material being separated, and then by heat and consequent destruction of the NaHF$_2$ molecules producing sodium fluoride and gaseous hydrogen fluoride. The NaF is recirculated. Various arrangements of the method are possible, and two such are hereinafter described.

Figure 2:
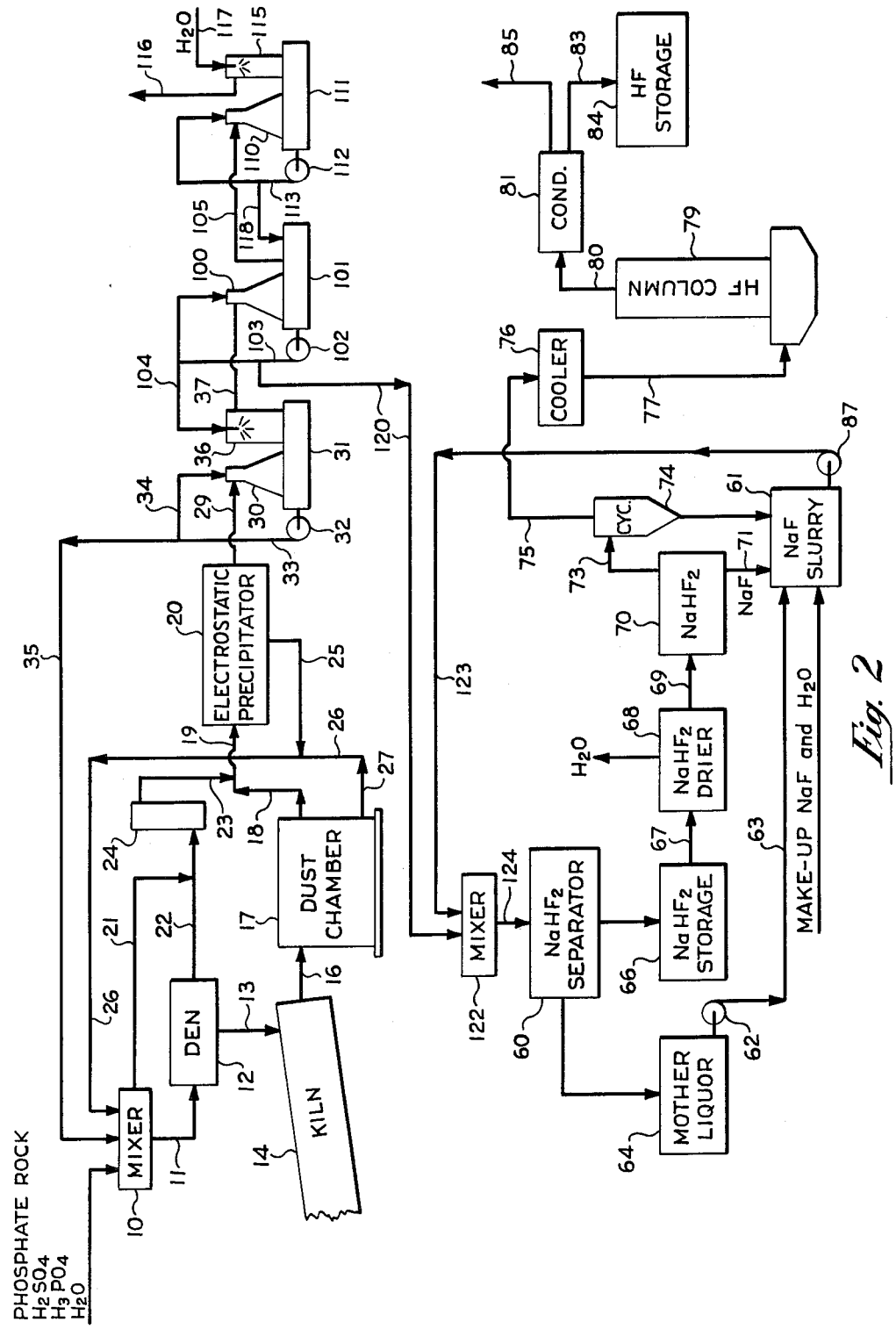

Other objects and advantages of the invention will appear from the following detailed description of two preferred embodiments thereof, reference during the description being made to the accompanying drawings, of which:

FIGURE 1 is a schematic representation of the flow process of one preferred embodiment according to the invention; and FIGURE 2 is a schematic representation of another flow system of preferred form according to the invention.

Referring first to FIGURE 1 of the drawings, in the upper left hand portion of the drawing there is shown a schematic system by which gases for treatment according to the invention may be produced. Gases from other suitable systems may be treated equally suitably. The only requirement of the system is that it produces waste gases of the type hereinafter described. The system shown is a portion of a plant for producing defluorinated tri-calcium phosphate. Phosphate rock, sulphuric acid, phosphoric acid, and water are fed into mixer 10 in which they are intimately mixed for chemical reaction and from which they are delivered through a conveyor or conduit 11 to a den 12. The den 12 serves as holding means for permitting completion of the reaction between the materials fed to the mixer. After substantial completion of the reaction in den 12 the mixed material is fed through conduit or conveyor 12 into a kiln 14. Kiln 14 may be a direct fired countercurrent rotary kiln as shown or any suitable substitute therefor. In kiln 14, the material is dried and calcined to drive off water, sulphur compounds, and any other volatile matter. The kiln temperature is normally between about 1900 degrees Fahrenheit and about 2600 to 2800 degrees Fahrenheit.

Flue gas passes through kiln 14 from the burner at the left hand end of the kiln (not shown) to be discharged at the right hand end of the kiln through conduit 16. The flue gas mixed with materials driven from the material calcined is introduced into a dust settling chamber 17 in which a substantial amount of the dust carried by the flue gas is settled out. Conduits 18 and 19 deliver the gas to electrostatic precipitator 20. Gases resulting from the chemical reaction in mixer 10 and den 12 are conveyed through conduits 21, 22, 23 and combustion chamber 24 to conduit 19, in order to prevent atmospheric contamination thereby at the plant site, and to recover valuable components thereof. In combustion chamber 24, the gases are burned to cause the chemical reaction, $SiF_4 + 2H_2O \rightarrow 4HF + SiO_2$, to go substantially to completion, this assisting the subsequent HF recovery by HF enrichment of the gases, and also by removal of substantial amounts of silicon from the gases, the benefit of the latter becoming apparent hereinafter.

When in connection with a plant such as that described, the gases in conduit 19 will usually contain sulphur dioxide ($SO_2$) silicon tetrafluoride ($SiF_4$), hydrofluosilicic acid ($H_2SiF_6$), hydrogen fluoride (HF), steam ($H_2O$), carbon dioxide ($CO_2$), air and perhaps also traces of carbon monoxide (CO) and sulphur trioxide ($SO_3$). Other volatile materials may also be present, as for example, hydrocarbon gases in the case where alkylation sulphuric acid has been used at mixer 10. Still other materials of gaseous nature may also be present in the gas stream. In addition to the gaseous components, solid materials in suspension are invariably present, including calcium phosphates of various forms, such as tri-calcium phosphates, dicalcium phosphates, monocalcium phosphates, and perhaps even such materials as pyro- and meta-phosphates. Also present are silicon dioxide ($SiO_2$) and other silicon bearing materials.

Although the same are not shown in the schematic drawings, it is contemplated that blowers, fans, valves, dampers, and the like may be included in an actual plant, the need for and locations of same being recognized only when the exact plant design is created.

In electrostatic precipitator 20, voltage is applied across a space through which the gaseous material and suspended solids therein are passed. The electrostatic energy causes the particles to become charged and to be attracted to an electrode of the electrostatic precipitator. The operation of electrostatic precipitators is well known in the art. Substantially all of the solid material is removed from the gas stream in the electrostatic precipitator 20, and is discharged either continuously or intermittently through conduit or conveyor 25. Conduit or conveyor 25 leads to conduit or conveyor 26 extending into the mixer 10, for recycle of the solid material. A conveyor or conduit 27 from dust chamber 17 delivers dust from the dust chamber to the mixer by the same route.

Gas which has been cleaned by electrostatic precipitation of substantially all of the solids therefrom in precipitator 20 is delivered through conduit 29 to the inlet of a tower 30 which may be of the Schutte & Koerting type indicated or any other suitable type, for example, a spray tower, a packed tower, or the like. Tower 30 is mounted above a sump tank 31 from which a pump 32 delivers liquid or slurry through line 33 to lines 34, 35. Line 34 delivers the scrubbing liquid to the top of tower 30, while line 35 returns excess scrubbing liquid to mixer 10 for recycling in the process. Also mounted above sump tank 31 is a spray tower, or the like, 36 through which the washed gases exit. The gases pass downwardly through tower 30, across the upper portion of sump tank 31, and upwardly out through tower 36. Through line 37, the gases are delivered to a second spray tower 38 of the same or different type as tower 30. Tower 38 is mounted above a sump tank 41. Pump 42 and line 43 deliver the scrubbing liquor to tower 38 to the upper end of the tower, from where it passes down through the tower to perform its scrubbing function and is returned to sump 41.

The gases introduced into tower 38 through line 37 pass downwardly through the tower into the upper portion of sump tank 41 and thence out of the sump tank through line 44 which leads to a third column 46 of the same or different type as towers 30 and 38. Tower 46 is disposed above a sump tank 47. Gas is delivered to tower 46 through line 44 passed downwardly to the tower into the upper portion of sump tank 47 and out of sump tank 47 through mist eliminator spray tower 48 and line 49 leading to a stack or for further use or treatment as desired. Pump 50 and line 51 delivers the scrubbing liquir of tower 46 from the lower portion of sump tank 47 to the upper end of tower 46 and also supplies spray tower 36 with liquor by means of branch line 53 which leads from line 51 to the upper end of spray tower 36.

The third scrubbing unit, i.e., spray tower 48 and tower 46 performs the final gas clean-up prior to exhausting the treated gases to the atmosphere via line 49 or subsequent recovery units such as an $SO_2$ recovery process. Water is introduced into spray tower 48 through line 52, thereby countercurrently scrubbing the gases passing through the tower. The liquor from spray tower 48 is collected in sump 47 from whence it is subsequently pumped through line 51 to both tower 46 and spray tower 36 . The scrubber solution passed through spray tower 36 contains absorbed HF and $SiF_4$ which forms $H_2SiF_6$ and rapidly becomes saturated with respect to the HF due to the gas-liquor HF vapor-pressure conditions prevailing in the first scrubber unit. Therefore, under normal operating conditions, liquor in sump 31 is saturated with respect to HF and less than saturated with respect to $H_2SiF_6$ thereby forming a solution which preferentially absorbs $SiF_4$ and $H_2SiF_6$ while passing the HF through the scrubber solution on to the second scrubber unit. Normal gas-liquor vapor pressure conditions in the first scrubber unit, i.e., tower 30 and spray tower 36, sustain a scrubber solution of fluosilicic acid saturated with hydrogen fluoride of a concentration of about 20 to 30 percent $H_2SiF_6$ and about 5 percent HF. Changes in the gas and scrubber liquor temperatures and pressures will, of course, vary the exact concentrations as well as will the ratio of scrubber liquor used per volume of gas and the fluoride value content of the gas. The $H_2SiF_6$ concentration in the scrubber liquor is controlled below saturation by recycling a proportion of scrubber liquor from sump 31 via lines 33 and 35 to mixer 10.

In the second scrubbing unit, the scrubbing liquid of tower 38 is delivered to sump tank 41 through line 55. Scrubbing liquor of tower 38 is delivered therefrom through line 56 connected from line 43.

Line 56 delivers scrubbing liquor from tower 38 to separator 60. Line 55 delivers sodium fluorine (NaF) slurry from a tank or other holding means 61 to sump tank 41. Thus, in the scrubbing tower 38, the gas from the plant process is scrubbed with sodium fluoride slurry to remove the hydrogen fluoride from the gas stream. The chemical reaction in tower 38 may be represented by the chemical equation:

$$NaF + HF \rightarrow NaHF_2$$

The scrubbing liquor delivered through line 56 to separator 60 contains $NaHF_2$ in suspension, and only an insignificant amount of NaF, if any. The amount of NaF circulated through tower 38 is regulated to be barely sufficient to absorb substantially all of the HF from the gases. An excess of NaF is objectionable because of the control of pH necessary to prevent occurrence of objectionable side reactions in the scrubbing liquor. Preferably, the pH is controlled to be below 2.5. A pH range between 1.5 and 2.5 is satisfactory, and the pH may be below 1.5 with no harmful results. However, the pH should not be permitted to go above 2.5 because of the resultant buildup of sulphates in the scrubbing liquor. At pH above 2.5 in the scrubbing liquor, in the presence of $SO_2$ and oxygen (air), the reaction, $2SO_2 + O_2 \rightarrow 2SO_3$, is caused to occur, with resultant buildup of $SO_4^=$ in the scrubbing liquor, to the extent of about 7 percent $SO_4^=$, or even higher.

It will, of course, be appreciated that where there is no $SO_2$, or only insignificant quantities thereof, in the gas being scrubbed, the pH of the scrubbing liquor need not be maintained below about 2.5. In such instances, higher pH values in the liquor may be used with no adverse side reactions or objectionable buildup of sulphates.

In separator 60, the sodium bifluoride is separated out. The mother liquor from which the sodium bifluoride has been separated is passed to a mother liquor tank 64. Mother liquor from tank 64 is circulated by pump 62 in line 63 to sodium fluoride slurry tank 61. Water and make-up sodium fluoride may be added to tank 61 as necessary.

Separated sodium bifluoride from separator 60 is delivered to a sodium bifluoride storage receptacle 66 from whence it passes by conveyor or conduit 67 to drier 68, wherein it is dried of moisture content and then delivered through conduit or conveyor 69 to HF liberator 70. The drying temperature of drier 68 is preferably between about 212 degrees Fahrenheit and about 260 degrees Fahrenheit. In liberator 70 the material is destructively heated to break the sodium bifluoride down into hydrogen fluoride gas and residual sodium fluoride, the temperature preferably being about 500–600 degrees Fahrenheit. The sodium fluoride is returned via element 71 to sodium fluoride slurry tank 61. The hydrogen fluoride gas is passed through line 73 and through cyclone separator 74, or the like, and therefrom through line 75 to cooler 76.

In cooler 76 the gas is cooled to about ambient temperature, is then passed through line 77 to the pot of a hydrogen fluoride distillation column 79. In column 79 the hydrogen fluoride is rectified to a pure composition and passed out through the upper end of the column through line 80 to condenser 81. In condenser 81, hydrogen fluoride is condensed (Preferably by refrigeration) at a temperature at least as low as 67 degrees Fahrenheit and passed through line 83 to hydrogen fluoride storage tank 84. Non-condensable materials reaching condenser 81 pass therefrom through line 85, usually to the atmosphere.

Sodium fluoride slurry from tank 61 is discharged by pump 87 into line 55 which delivers the slurry to sump tank 41 of tower 38.

Example I, below, indicates the operating conditions and results obtained during pilot plant operation of the flow system embodiment according to FIGURE 1 of the drawings:

*Example I*

The gas entering the process at conduit 19 contained 0.22 pound of dust per 1000 cubic feet per minute of gas at the gas entrance temperature of 900 degrees Fahrenheit. The entering gas contained 1 percent F (by volume) of which about half was in the form of HF, the remainder being in the form of $SiF_4$. The entering gas contained 3 percent $SO_2$ and no $SO_3$.

In electrostatic precipitator 20, better than 99 percent (by weight) of the dust was removed from the gas stream, leaving the gas stream substantially dust free.

The temperature of the entering gas was 875 degrees Fahrenheit, and the gas temperature was reduced to about 90 degrees Fahrenheit in tower 30 by the cooling action of the scrubbing liquor. In tower 30, about 0.22 gallon of water per 1000 cubic feet of gas is taken up by the gas stream which leaves tower 30 and enters tower 38 at 100 percent relative humidity.

In tower 30, 92 percent of the $SiF_4$ entering the tower in the gas was absorbed in the scrubbing liquor, the scrubbing liquor having a concentration of $H_2SiF_6$ between 20 percent and 30 percent (by weight) resulting therefrom. The liquor contained 5 percent HF, which remained constant at about that level because of the gas-liquor HF vapor pressure conditions prevailing in the tower. Scrubbing liquor was removed from the tower through line 35 at a rate to maintain the $H_2SiF_6$ concentration of the liquor in the aforementioned range.

In tower 38, the sodium bifluoride slurry was maintained at a concentration of 30 percent $NaHF_2$ (by weight), or somewhat less, at which concentrations its flow characteristics are satisfactory. NaF was added in amounts to maintain the pH of the scrubbing liquor at 2.5, or slightly below. A pH of 2.5 in the scrubbing liquor represents a condition wherein there is no excess of HF over the NaF in the liquor, while a pH below 2.5 represents a condition wherein there is an excess of HF dissolved in the scrubbing liquor. Several percent of HF can be tolerated in the liquor without significant HF loss from the tower, as has previously been explained.

The gas leaving tower 38 contained practically no HF, over 99 percent of the HF entering the tower in the gas stream having been absorbed in the scrubbing liquor of tower 38. About 67 gallons per minute of scrubbing liquor were circulated in tower 38 per 1000 cubic feet of gas passed through the tower.

In tower 46, the circulated scrubbing liquor contained 0.5 percent HF, and the gas leaving the tower through mist eliminator 48 contained less than 0.01 percent HF by volume. This gas contained 3 percent $SO_2$ by volume, the same as the entering gas.

Liquor was withdrawn from tower 38 and HF recovered therefrom. By centrifuging the liquor, $NaHF_2$ cakes were obtained containing between 75 percent and 95 percent $NaHF_2$, the average being 86 percent $NaHF_2$, the average weight loss on drying at 230 degrees Fahrenheit—240 degrees Fahrenheit being 12 percent. After the cake was dried, it was heated in a laboratory oven at 550 degrees Fahrenheit, the HF being collected and the residue constituting NaF suitable for re-use in tower 38.

Referring now to FIGURE 2 of the drawings, there is shown a modified process for obtaining substantially the same results as are obtained by the process of FIGURE 1.

FIGURE 2 is identical with FIGURE 1 in its upper left hand portions and will not be redescribed. The portion of FIGURE 2 similar to FIGURE 1 is completed at towers 30 and 36. The same reference numerals are applied to this portion of FIGURE 2 as are applied to FIGURE 1. The same description applies to both FIGURE 1 and 2 as to this portion of the figures.

In FIGURE 2, line 37 discharges gas to tower 100 from which substantially all of the solids have been electrostatically precipitated and from which the bulk of the $SiF_4$ has been washed. Tower 100 is mounted above sump tank 101, and scrubbing liquor therein is discharged from tank 101 through pump 102 and line 103. Line 103 delivers scrubbing liquor to the upper end of tower 100, a portion being delivered to tower 36 through line 104. Gas introduced to tower 100 through line 37 passes downwardly through tower 100 and across the upper portion of tank 101 to be discharged through line 105 to a third tower 110. Tower 110 may be the same or different as towers 30 and 100. Tower 110 is mounted above a sump tank 111 from which scrubbing liquor therein is discharged through pump 112 and line 113 which recycles the scrubbing liquor to the top of tower 110. Gas introduced to tower 110 through line 105 passes downwardly through the tower and across the upper portion of sump tank 111 to exit through mist eliminating spray tower 115 to line 116 to be discharged to the atmosphere or for further processing as desired. Water is introduced to tower 115 through line 117. From line 113 a branch line 118 delivers a portion of the scrubbing liquor of tower 110 to sump tank 101 of tower 100.

A branch line 120 is provided from line 103 to deliver a portion of the scrubbing liquor of tower 100 to a mixer 122. Sodium fluoride slurry is introduced into mixer 122 through line 123. In mixer 122, a water solution of hydrogen fluoride obtained via line 120 from scrubbing towers 100, 110 is mixed with the sodium fluoride slurry to enable the reaction previously described in connection with FIGURE 1 to take place. Sodium fluoride reacts with hydrogen fluoride to form sodium bifluoride. The reacted mixture is passed through line 124 to separator 60 which is the same as previously described in connection with FIGURE 1. Thereafter, the process proceeds the same as has been described with regard to FIGURE 1, and the system is identical therewith. Therefore, the terminal part of the process of FIGURE 2 will not be again described in detail since the description of FIGURE 1 applied equally thereto. Again the sodium bifluoride is separated and dried, the HF liberated in liberator 70, and the sodium fluoride resulting is recirculated to sodium fluoride slurry tank 61.

The HF gas is passed to cyclone separator 74 and to cooler 76 wherein it is condensed to a liquid and thereafter the liquid is fractionated in hydrogen fluoride as in column 79 to yield anhydrous HF.

It will be noted that the primary distinction between the FIGURE 1 and FIGURE 2 embodiments of the invention is that, in the case of the FIGURE 1 embodiment, the treatment of the fluorine constituent of the gas stream with sodium fluoride is done in a scrubbing tower, while in the case of the FIGURE 2 embodiment, the reaction of HF with sodium fluoride is carried out in a separate mixer. Of the two embodiments, the FIGURE 1 embodiment is slightly more efficient, since the presence of sodium fluoride in scrubbing tower 38 insures more complete removal of hydrogen fluoride from the gas stream. In the FIGURE 2 embodiment, water alone is used as the scrubbing agent and the solubility of hydrogen fluoride in water is a limiting factor. In both processes, the scrubbing in the first tower, i.e., tower 30, a fluosilicic acid solution saturated with hydrogen fluoride is used. In the embodiment of FIGURE 2, some HF is normally volatilized from the scrubber liquor supplied from sump 101 as $SiF_4$ is absorbed in preference to the HF due to the gas-liquid vapor pressures encountered.

Operating conditions and results obtained during pilot plant testing of the flow system of FIGURE 2 are set forth in the following Example II.

*Example II*

A pilot plant test was made according to the flow system of FIGURE 2 of the drawings. The gas fed through conduit 29 was the same as in Example I and the gas passing through conduit 37 to tower 100 was the same as was passed through conduit 37 to tower 38 in Example I.

In towers 100, 110 according to FIGURE 2, the gas was scrubbed with water, the water entering at spray tower 115, being recycled in tower 110, and then delivered to sump 101 of tower 100 for recycle in that tower.

The washing liquor in tower 110 contained approximately 0.5 percent HF (by weight), the gas passing out of the system through line 116 containing less than 0.01 percent F (by volume), and 3 percent $SO_2$ (by volume), the latter being the same as in the input gas. After a period of operation, the HF concentration in the scrubbing liquor of tower 100 gradually built up to approximately 25 percent HF. This liquor was withdrawn and mixed with a sufficient amount of a slurry containing 30 percent NaF to cause the pH to rise to 2.5, this pH indicating the presence of $NAHF_2$ without substantial excess of either HF or NaF in the resultant mixture, the reaction, $$HF + NaF \rightarrow NaHF_2$$

being very rapid. The mixture was then centrifuged, producing a $NaHF_2$ cake identical with that produced in Example I, which when dried and heated, resulted in formation of HF gas and reusable NaF.

In the embodiments of the process of both FIGURES 1 and 2, the controls necessary for good operation are easily provided. The pH control of the scrubbing liquor of FIGURE 1 has been mentioned, excess of HF giving pH less than 2.5, as is desired and excess of NaF giving pH greater than 2.5, which is undesirable. The gas cleanup tower 30 of both embodiments is primarily to remove $SiF_4$ from the gas (as $H_2SiF_6$) to prevent an excess of same in the HF removal system. The final towers 46, 110 are provided to remove the remaining small amount of HF from the gas stream to prevent atmospheric contamination if the gases eventually are passed into the atmosphere or to further clean up the gases for further processing. The gases are suitable for use to produce sulphuric acid in a more or less conventional plant wherein catalytic oxidation of the $SO_2$ to $SO_3$ is carried out. Usually, $SO_2$ enrichment of the gas by sulphur burning is desirable.

Water balance of the scrubbing system and plant is controlled by appropriate regulations of the water feed and recycles at the scrubbing system.

The use of sodium fluoride in slurry form as employed in this invention is an important advance in the art. In prior systems employing solid sodium fluoride in air, the handling of the materials was considerably more difficult, and the efficiency of the removal of HF from a gas stream was lower because of the less intimate contact of the gas stream with sodium fluoride in lump or pelleted form. Also, as would be expected in such a system employing solid sodium fluoride, the rapid initial reaction at the exterior surfaces of the pellets with subsequent decreased reaction rate thereafter has been a serious problem. But, by employing the sodium fluoride in slurry form, no such deleterious effect is encountered in the case of this invention.

Since substantially all of the sodium fluoride is recovered in the systems shown in both FIGURES 1 and 2 of the drawings, only a minor amount of make-up sodium fluoride must be used in order to maintain operation. Thus, the sodium fluoride is employed as a recovery agent for production of hydrogen fluoride, of high value, without necessity of replacement of the agent sodium fluoride in large amounts.

It will be realized that the flow systems of FIGURES 1 and 2 are exemplary only, and that any number of other arrangements of equipment and flow can be created which will accomplish substantially the same purpose. Therefore, the particular apparatus indicated is not in limitation of the invention.

It has been found that drier 68 and sublimator 70, shown in both FIGURES 1 and 2, can be efficiently heated by employing Dowtherm heating systems. The temperature of drying of the material is slightly above the boiling point of water, while the most effective sublimation temperature range is between 500 degrees Fahrenheit and 600 degrees Fahrenheit. At temperatures below 500 degrees Fahrenheit, the desired results are obtained, but at a slower rate. Temperatures above 600 degrees Fahrenheit may be employed, but it is expected that temperatures above 1817 degrees Fahrenheit (992 degrees centigrade), the melting point of NaF, would lead to handling problems, and that temperatures above 600 degrees Fahrenheit do not greatly improve the NaF–HF dissociation.

While preferred embodiments of the invention have been shown and described, many modifications thereof may be made by a person skilled in the art without departing from the spirit of the invention, and it is intended to protect by Letters Patent all forms of the invention falling within the scope of the following claims.

What is claimed is:

1. A method of recovering as sodium bifluoride, hydrogen fluoride from waste gases obtained in phosphate rock acidulation and calcination processes, which gases contain suspended solids, including dust, and fluorine values, including hydrogen fluoride and silicon tetrafluoride, comprising separating substantially all of the suspended solid impurities including the dust from the waste gas, contacting said waste gas mixture with an aqueous solution of fluosilicic acid saturated with hydrogen fluoride, thereby preferentially removing the silicon tetrafluoride constituents by absorbing said silicon tetrafluoride constituents in said fluosilicic acid solution and subsequently contacting said waste gas containing hydrogen fluoride from which said silicon tetrafluoride constituents were removed by absorption in the fluosilicic acid solution, with an aqueous sodium fluoride-sodium bifluoride slurry, thereby removing hydrogen fluoride from said waste gas by absorbing and reacting said hydrogen fluoride in said aqueous sodium fluoride-sodium bifluoride slurry to precipitate hydrogen fluoride as sodium bifluoride in said slurry.

2. The method of claim 1 wherein the pH of said aqueous sodium fluoride-bifluoride slurry does not exceed 2.5.

3. The method of claim 1 wherein the pH of said aqueous sodium fluoride-bifluoride slurry is maintained between 1.5 and 2.5.

4. The method of claim 1 wherein after contacting the waste gas with an aqueous solution of fluosilicic acid to remove silicon tetrafluoride constituents from the waste gas, containing fluoride values substantially as hydrogen fluoride, is scrubbed with water thereby removing said hydrogen fluoride from said waste gas, and wherein said scrubbing water is subsequently mixed and reacted with an aqueous sodium fluoride-bifluoride slurry thereby precipitating the hydrogen fluoride in said slurry as sodium bifluoride.

5. A method of recovering as sodium bifluoride, hydrogen fluoride from waste gases obtained in phosphate rock acidulation and calcination processes, which gases contain suspended solid impurities including dust and silicon dioxide, and fluorine values including hydrogen fluoride and silicon tetrafluoride, separating substantially all of the suspended solid impurities including silicon dioxide from the waste gas, contacting said waste gas containing hydrogen fluoride and silicon tetrafluoride with an aqueous fluosilicic acid solution saturated with hydrogen fluoride thereby preferentially absorbing silicon tetrafluoride constituents from said waste gas, recycling at least a portion of said fluosilicic acid solution and absorbed silicon tetrafluoride constituents to the phosphate rock treatment process, subsequently contacting said waste gas containing hydrogen fluoride from which said silicon tetrafluoride constituents were removed by absorption in the fluosilicic acid solution with an aqueous sodium fluoride-sodium bifluoride slurry, absorbing and reacting said hydrogen fluoride with said aqueous sodium fluoride-sodium bifluoride slurry thereby precipitating hydrogen fluoride as sodium bifluoride.

6. The method of claim 5 wherein the hydrogen fluoride precipitated as sodium bifluoride is withdrawn from said aqueous slurry, dried and subsequently heated to above its decomposition temperature to yield hydrogen fluoride and sodium fluoride thereby recovering a purified hydrogen fluoride.

7. A method for recovering hydrogen fluoride contained in minor quantities in gas mixtures, wherein said gas mixtures contain solid impurities including dust and silicon dioxide and fluoride values including silicon tetrafluoride and hydrogen fluoride, comprising separating substantially all of the suspended solid impurities including the silicon dioxide from the gas mixture, contacting said gas mixture containing hydrogen fluoride and silicon tetrafluoride constituents with an aqueous fluosilicic acid solution saturated with hydrogen fluoride thereby preferentially absorbing the silicon tetrafluoride constituents from said waste gas, subsequently contacting said waste gas containing hydrogen fluoride from which said silicon tetrafluoride constituents were removed by absorption in the fluosilicic acid solution with an aqueous sodium fluoride-sodium bifluoride slurry at a pH of not more than 2.5, absorbing and reacting said hydrogen fluoride with said aqueous sodium fluoride-sodium bifluoride slurry and thereby precipitating hydrogen fluoride as sodium bifluoride, withdrawing sodium bifluoride, drying and subsequently heating said sodium bifluoride to above its decomposition temperature to yield a purified hydrogen fluoride and sodium fluoride.

8. The method of claim 7 wherein the aqueous sodium fluoride-bifluoride slurry contains up to about 30 percent sodium bifluoride by weight.

9. The method of claim 7 wherein the pH of said aqueous sodium fluoride-bifluoride slurry is between 1.5 and 2.5.

10. The method of claim 7 wherein the sodium fluoride formed on decomposing sodium bifluoride is recycled for further fluoride absorption.

11. The method of claim 7 wherein the sodium bifluoride precipitated is dried at a temperature of 212 degrees Fahrenheit to 260 degrees Fahrenheit and subsequently decomposed to liberate hydrogen fluoride at a temperature of about 500 to 600 degrees Fahrenheit.

12. The method of claim 7 wherein after contacting the waste gas with an aqueous solution of fluosilicic acid to remove silicon tetrafluoride constituents, the waste gas, containing fluoride values substantially as hydrogen fluoride, is scrubbed with water thereby removing said hydrogen fluoride from said waste gas and wherein said scrubbing water is subsequently mixed and reacted with an aqueous sodium fluoride-bifluoride slurry, thereby precipitating the hydrogen fluoride in said scrubbing water as sodium bifluoride.

13. A method for recovering hydrogen fluoride from waste gases containing minor quantities of hydrogen fluoride and silicon tetrafluoride constituents and suspended solid impurities including dust and silicon dioxide comprising hydrolyzing the silicon tetrafluoride constituents of said gases to form silicon dioxide and hydrogen fluoride, separating substantially all of the suspended solid impurities including silicon dioxide from the waste gas, contacting said waste gas containing hydrogen fluoride and unreacted silicon tetrafluoride constituents with an aqueous fluosilicic acid solution saturated with hydrogen fluoride thereby preferentially absorbing silicon tetrafluoride constituents from said waste gas, recycling at least a portion of said fluosilicic acid solution and absorbed silicon tetrafluoride constituents to the process thereby subjecting said solution to hydrolysis to form silicon dioxide and hydrogen fluoride, subsequently contacting said waste gas passed in contact with said fluosilicic acid solution and containing fluoride values substantially as hydrogen fluoride with an aqueous sodium fluoride-sodium bifluoride slurry of up to about 30 percent sodium bifluoride at a pH of not more than 2.5, absorbing the reacting said hydrogen fluoride with said aqueous sodium fluoride-sodium bifluoride slurry thereby precipitating hydrogen fluoride as sodium bifluoride, withdrawing sodium bifluoride, drying and subsequently heating said sodium bifluoride to above its decomposition temperature to yield a purified hydrogen fluoride and sodium fluoride.

No references cited.

OSCAR R. VERTIZ, *Primary Examiner.*

E. STERN, *Assistant Examiner.*